United States Patent
Swoboda et al.

(10) Patent No.: US 6,893,693 B2
(45) Date of Patent: May 17, 2005

(54) HIGH GLOSS DISPOSABLE PRESSWARE

(75) Inventors: Dean P. Swoboda, DePere, WI (US); Jack D. Hultman, Neenah, WA (US); Darrell F. Krause, Appleton, WI (US)

(73) Assignee: Georgia-Pacific Corporation, Atlanta, GA (US)

( * ) Notice: Subject to any disclaimer, the term of this patent is extended or adjusted under 35 U.S.C. 154(b) by 171 days.

(21) Appl. No.: 10/004,874

(22) Filed: Dec. 7, 2001

(65) Prior Publication Data

US 2002/0119265 A1 Aug. 29, 2002

Related U.S. Application Data

(60) Provisional application No. 60/257,339, filed on Dec. 21, 2000.

(51) Int. Cl.[7] .......................... B32B 29/00; B32B 29/04; A47J 27/00
(52) U.S. Cl. ................... 428/34.2; 428/34.1; 428/35.7; 428/411; 229/584
(58) Field of Search .............................. 428/34.1, 35.7, 428/411; 229/5.84

(56) References Cited

U.S. PATENT DOCUMENTS

| | | | |
|---|---|---|---|
| 2,911,320 A | 11/1959 | Phillips ...................... 117/64 |
| 3,336,862 A | * 8/1967 | Brundige et al. ........... 100/162 |
| 3,963,843 A | 6/1976 | Hitchmough et al. ....... 427/361 |
| 4,078,924 A | 3/1978 | Keddie et al. .............. 96/1 LY |
| 4,112,192 A | 9/1978 | Vreeland .................... 428/511 |
| 4,238,533 A | 12/1980 | Pujol et al. ................. 427/359 |
| 4,478,974 A | 10/1984 | Lee et al. ................... 524/533 |
| 4,503,096 A | 3/1985 | Specht ....................... 427/359 |
| 4,521,459 A | 6/1985 | Takeda ....................... 427/359 |
| 4,567,099 A | 1/1986 | Van Gilder et al. ......... 428/327 |
| 4,606,496 A | 8/1986 | Marx et al. .............. 229/2.5 R |
| 4,609,140 A | 9/1986 | Van Handel et al. ... 229/205 R |
| 4,609,704 A | 9/1986 | Hausman et al. ........... 524/710 |
| 4,721,499 A | 1/1988 | Marx et al. ................. 493/152 |
| 4,721,500 A | 1/1988 | Van Handel et al. ....... 493/152 |
| 4,781,566 A | 11/1988 | Rossi et al. ................. 425/400 |
| 4,832,677 A | 5/1989 | Hudgens et al. ............ 493/369 |
| 4,898,752 A | 2/1990 | Cavagna et al. ............ 427/265 |
| 4,948,635 A | 8/1990 | Iwasaki ...................... 427/345 |
| 4,997,682 A | 3/1991 | Coco .......................... 427/362 |
| 5,033,373 A | 7/1991 | Brendel et al. ............... 100/38 |
| 5,049,420 A | 9/1991 | Simons ....................... 427/361 |
| 5,088,640 A | 2/1992 | Littlejohn ................ 229/2.5 R |
| 5,169,715 A | 12/1992 | Maubert et al. ............ 428/331 |
| 5,203,491 A | 4/1993 | Marx et al. .............. 229/2.5 R |
| 5,249,946 A | 10/1993 | Marx ......................... 425/142 |
| 5,326,020 A | 7/1994 | Cheshire et al. ......... 229/2.5 R |
| 5,334,449 A | 8/1994 | Bergmann et al. .......... 428/327 |
| 5,340,611 A | 8/1994 | Kustermann et al. ....... 427/361 |
| 5,603,996 A | 2/1997 | Overcash et al. .......... 428/34.2 |
| 5,609,686 A | 3/1997 | Jerry et al. ................. 118/123 |
| 5,770,303 A | 6/1998 | Weinert et al. ............. 428/326 |
| 5,776,619 A | 7/1998 | Shanton ..................... 428/511 |
| 5,795,928 A | 8/1998 | Janssen et al. ................ 524/48 |
| 5,830,548 A | 11/1998 | Andersen et al. .......... 428/36.4 |
| 5,852,166 A | 12/1998 | Gruber et al. .............. 528/354 |
| 5,869,567 A | 2/1999 | Fujita et al. ................ 524/608 |
| 5,932,651 A | 8/1999 | Liles et al. ................. 524/838 |
| 5,972,167 A | 10/1999 | Hayasaka et al. ........... 162/135 |
| 5,981,011 A | 11/1999 | Overcash et al. .......... 428/40.9 |

* cited by examiner

*Primary Examiner*—Harold Pyon
*Assistant Examiner*—Marc Patterson
(74) *Attorney, Agent, or Firm*—Michael W. Ferrell (57) ABSTRACT

A high gloss, disposable pressed paperboard food container includes a glossy bilayer finish. The container is formed in a heated die set from a paperboard substrate provided with a first finish coating layer consisting essentially of a styrene-butadiene resin composition and a second, top coating finish layer consisting essentially of an acrylic resin composition applied to the first finish coating layer. The products of the invention typically exhibit a 60° gloss of greater than about 40 gloss units, as well as reduced moisture pickup and enhanced rigidity.

27 Claims, 2 Drawing Sheets

HIGH GLOSS DISPOSABLE PRESSWARE

CLAIM FOR PRIORITY

This non-provisional application claims the benefit of the filing date of U.S. Provisional Patent Application Ser. No. 60/257,339, of the same title, filed Dec. 21, 2000.

TECHNICAL FIELD

The present invention relates generally to disposable paper plates, paper bowls and the like and more particularly to disposable paper presswware having a a styrene-butadiene and acrylic surface. Preferred coats exhibit gloss of at least about 40 gloss units (60 degree) and preferably at least about 50 gloss units and/or enhanced performance characteristics.

BACKGROUND

Disposable paper food containers are well known. Typically, such articles are made by way of pulp-molding processes or by way of pressing a planar paperboard container blank in a matched metal heated die set. Illustrative in this regard are U.S. Pat. No. 4,606,496 entitled "Rigid Paperboard Container" of R. P. Marx et al; U.S. Pat. No. 4,609,140 entitled "Rigid Paperboard Container and Method and Apparatus for Producing Same" of G. J. Van Handel et al; U.S. Pat. No. 4,721,499 entitled "Method of Producing a Rigid Paperboard Container" of R. P. Marx et al; U.S. Pat. No. 4,721,500 entitled "Method of Forming a Rigid Paper-Board Container" of G. J. Van Handel et al; U.S. Pat. No. 5,088,640 entitled "Rigid Four Radii Rim Paper Plate" of M. B. Littlejohn; U.S. Pat. No. 5,203,491 entitled "Bake-In Press-Formed Container" of R. P. Marx et al; and U.S. Pat. No. 5,326,020 entitled "Rigid Paperboard Container" of J. O. Chesire et al. Equipment and methods for making paperboard container are also disclosed in U.S. Pat. No. 4,781,566 entitled "Apparatus and Related Method for Aligning Irregular Blanks Relative to a Die Half" of A. F. Rossi et al; U.S. Pat. No. 4,832,677 entitled "Method and Apparatus for Forming Paperboard Containers" of A. D. Johns et al; and U.S. Pat. No. 5,249,946 entitled "Plate Forming Die Set" of R. P. Marx et al.

Paperboard for disposable presswware typically includes polymer coatings. Illustrative in this regard are U.S. Pat. No. 5,776,619 to Shanton and U.S. Pat. No. 5,603,996 to Overcash et al. The '619 patent discloses plate stock provided with a base coat which includes a styrene-acrylic polymer as well as a clay filler as a base coat as well as a top coat including another styrene acrylic polymer and another clay filler. The use of fillers is common in the art as may be seen in the '996 patent to Overcash et al. In the '996 patent a polyvinyl alcohol polymer is used together with an acrylic emulsion as well as a clay to form a barrier coating for a paperboard oven container. See column 12, lines 50 and following. Indeed, various coatings for paper form the subject matter of many patents including the following: U.S. Pat. No. 5,981,011 to Overcash et al.; U.S. Pat. No. 5,334,449 to Bergmann et al.; U.S. Pat. No. 5,169,715 to Maubert et al..; U.S. Pat. No. 5,972,167 to Hayasaka et al..; U.S. Pat. No. 5,932,651 to Liles et al.; U.S. Pat. No. 5,869,567 to Fujita et al.; U.S. Pat. No. 5,852,166 to Gruber et al.; U.S. Pat. No. 5,830,548 to Andersen et al.; U.S. Pat. No. 5,795,928 to Janssen et al.; U.S. Pat. No. 5,770,303 to Weinheart et al.; U.S. Pat. No. 4,997,682 to Coco; U.S. Pat. No. 4,609,704 to Hausman et al.; U.S. Pat. No. 4,567,099 to Van Gilder et al.; and U.S. Pat. No. 3,963,843 to Hitchmough et al. The disclosure of the foregoing patents is incorporated into this application by reference.

SUMMARY OF INVENTION

There is provided in accordance with the present invention a high gloss disposable paperboard food container with a glossy bilayer finish formed in a heated die set from a paperboard blank. The paperboard blank is prepared from a paperboard substrate provided with a first finish coating layer consisting essentially of a styrene-butadiene resin composition and a second, top finish coating layer consisting essentially of an acrylic resin composition applied to the first layer. The food container of the invention exhibits a surface gloss of at least about 40 gloss units at 60° as measured by test method ASTM D523-89. More preferably, the high gloss paperboard food container according to the invention exhibits a surface gloss of 45 or more, and in some embodiments at least about 50 gloss units at 60° (ASTM D523-89). Typically the products exhibit a surface gloss between about 45 and 65 gloss units. In general, the coating compositions applied to the paperboard include suitable cross-linking agents and are water-borne compositions. The first finish coating layer of resin is generally applied to the paperboard substrate in an amount of from about 0.25 pounds per 3,000 square foot ream to about 1.5 pounds per 3,000 square foot ream. Typically the first coating is applied in an amount of at least about 0.5 pounds per square foot ream, from about 0.6 to about 1 lb per 3,000 square foot ream being preferred in some cases.

The second (acrylic) finish coating or top finish coating is generally applied in amounts similar to the first coating. That is, generally from about 0.25 pounds per 3,000 square foot ream to about 1 pound per 3,000 square foot ream. Again, the top finish coating is typically applied in an amount of at least about 0.5 pounds per 3,000 square foot ream If the primary goal is strength enhancement or reduced moisture pickup over the current control; we would prefer to use from about 0.25 to about 0.5 lbs/3000 square foot ream of styrene-butadiene resin and approximately double that amount of acrylic coating.

Most preferably, the styrene-butadiene resin composition includes a carboxylated styrene-butadiene resin.

In general, the paperboard substrate has a basis weight of from about 100 to about 300 pounds per 3,000 square foot ream. In some embodiments the paperboard substrate may have a basis weight of from about 125 to about 150 pounds per square foot ream while in other embodiments the paperboard substrate may have a basis weight of from about 150 to about 200 pounds per square foot ream. The paperboard is usually sized with a starch composition in an amount of from about 4 to about 8 pounds per 3,000 square foot ream prior to being coated. In some embodiments the paperboard will be sized with a starch composition in an amount of from about 6 to about 7 pounds per 3,000 square foot ream. For higher strength products, the amount of starch in the board is preferably in the range of from about 8 to about 15 lbs of starch per 3000 square foot ream. The sized paperboard substrate is typically coated with one or more clay coatings in a coatweight amount of from about 8 lbs of clay coating per 3,000 square foot ream to about 24 lbs of clay coating per 3,000 square foot ream prior to being coated with the first and second finish coating layers.

The first finish coating composition consists essentially of a styrene-butadiene resin composition that includes a styrene-butadiene resin, crosslinking agents and so forth, but does not include a substantial amount of mineral fillers which would alter the basic and novel characteristics of the invention, i.e., enhanced gloss, increased wet and dry rigidity and reduced moisture pickup. Preferably, the styrene-butadiene resin composition contains no mineral filler whatsoever. Likewise, the acrylic resin composition forming the second or top finish layer includes an acrylic resin, crosslinking agents and so forth, but does not include substantial amounts of mineral filler which would alter the basic and novel characteristics of the present invention. Preferably, the acrylic resin composition contains no mineral filler whatsoever; in some embodiments, however, it may be possible to add up to about 2 lbs of mineral filler per 3,000 square foot ream in the two finish layers while maintaining enhanced gloss and performance characteristics. For embodiments where gloss enhancement is not the primary goal, only those mineral fillers detracting from the rigidity and moisture pickup qualities of the coating need be avoided and it may be possible to add slightly more mineral filler to the finish coats without changing the basic and novel characteristics of the presware.

As used herein, "coatweight", lbs of coating per 3,000 square feet and like terminology refers to the lbs of coating on a dry basis, i.e., without the water medium in which the coating is dispersed prior to its application to the paperboard.

As noted above the inventive articles are generally made in a heated die set. Such apparatus is well known in the art and is operated in accordance with the present invention with a die forming surface temperature of from about 250° F. to about 400° F.

In another embodiment of the present invention there is provided a method of making a high gloss paperboard food container with a glossy bilayer finish including the steps of:
 a) preparing a coated paperboard substrate provided with a first finish coating layer consisting essentially of a styrene-butadiene resin composition and a second, top finish coating layer consisting essentially of an acrylic resin composition applied to the first layer;
 b) scoring the paperboard with a pre-determined scoring pattern suitable for forming the food container;
 c) cutting the scored paperboard into a shape suitable for forming the food container; and
 d) heat pressing the paperboard blank into a high gloss pleated container wherein the food container exhibits a surface gloss of at least about 40 gloss units at 60° as measured by test method ASTM D523-89.

In a still further aspect of the present invention there is provided a coated paperboard for making high gloss food containers which exhibit a surface gloss of at least about 40 gloss units at 60° as measured by test method ASTM D523-89 including a paperboard substrate sized with starch in an amount of from about 4 to 15 pounds of starch per 3,000 square feet of paperboard and provided with a clay coating; a first finish layer consisting essentially of a styrene-butadiene resin composition in an amount of from about 0.25 pounds per 3,000 square foot ream to about 1.5 pounds per 3,000 square foot ream and a second, top coat finish layer consisting essentially of an acrylic resin composition applied to the first layer in an amount of from about 0.25 pounds per 3,000 square foot ream to about 1 pound per square foot ream. The paperboard substrate is typically coated with one or more clay coatings in a cumulative coatweight (solids) amount of from about 8 lbs of clay per 3,000 square foot ream to about 24 lbs of clay coating per 3,000 square foot ream.

In still yet another further aspect of the invention, there is provided a method for improving the wet rigidity of a food container formed in a heated die set from a paperboard blank, wherein the paperboard blank is prepared from a starch-sized paperboard substrate provided with a clay coating and a finish coating applied thereto, the improvement comprising applying a first finish coating layer to the clay coating consisting essentially of a styrene-butadiene resin composition, and applying a second top finish coating layer to the first finish coating layer consisting essentially of an acrylic resin composition. The product is provided with a plurality of pleats about its periphery and is characterized by enhanced wet rigidity. A typical moisture pickup reduction may be 40% or so in accordance with the invention. The first coating typically is applied in an amount of at least about 0.5 lbs per 3000 square foot ream of paperboard. A carboxylated styrene-butadiene resin is preferred as are starch loadings of from about 4–15 lbs of starch per 3000 square foot ream of paperboard. The claimed method typically reduces moisture pickup as well and enhances dry rigidity.

BRIEF DESCRIPTION OF DRAWINGS

The invention is described in detail below with reference to the various figures wherein like numbers indicate similar parts and wherein.

DETAILED DESCRIPTION

The invention is described in detail below with reference to the various figures and tables. Such description is for purposes of exemplification only. Various modifications to specific embodiments described within the spirit and scope of the present invention which is set forth in the appended claims will be readily apparent to one of skill in the art.

Generally speaking, the present invention is directed to high gloss presware containers with a glossy bilayer finish exhibiting a surface gloss of at least about 40 gloss units at 60° as measured by ASTM D523-89. The surface gloss is achieved by a unique combination of coatings as described hereinafter. The paperboard may be any suitable paperboard known in the art; typically coated or sized with a starch (sizing) composition in a sizing press in an amount of from about 4 to about 15 pounds per 3,000 square foot ream. Suitable commercially available sizing agents containing starch include: "PENFORD.RTM. GUMS 200," "PENFORD.RTM. GUMS 220," "PENFORD.RTM. GUMS 230," "PENFORD.RTM. GUMS 240," "PENFORD.RTM. GUMS 250," "PENFORD.RTM. GUMS 260," "PENFORD.RTM. GUMS 270," "PENFORD.RTM. GUMS 280," "PENFORD.RTM. GUMS 290," "PENFORD.RTM. GUMS 295," "PENFORD.RTM. GUMS 300," "PENFORD.RTM. GUMS 330," "PENFORD.RTM. GUMS 360," "PENFORD.RTM. GUMS 380," "PENFORD.RTM. GUMS PENCOTE.RTM.," "PENFORD.RTM. GUMS PENSPRAE.RTM. 3800," "PENFORD.RTM. GUMS PENSURF," "PENGLOSS.RTM.," "APOLLO.RTM. 500," "APOLLO.RTM. 600," "APOLLO.RTM. 600-A," "APOLLO.RTM. 700," "APOLLO.RTM. 4250," "APOLLO.RTM. 4260," "APOLLO.RTM. 4280," "ASTRO.RTM. GUMS 3010," "ASTRO.RTM. GUMS 3020," "ASTROCOTE.RTM. 75," "POLARIS.RTM. GUMS HV," "POLARIS- .RTM. GUMS MV," "POLARIS.RTM. GUMS LV," "ASTRO.RTM. X 50," "ASTRO.RTM. X 100," ASTRO.RTM. X 101,"ASTRO.RTM. X 200," "ASTRO.RTM. GUM 21," "CALENDER SIZE 2283," "DOUGLAS.RTM.-COOKER 3006," "DOUGLAS.RTM.-COOKER 3007," "DOUGLAS.RTM.-COOKER 3012-T," "DOUGLAS.RTM.-COOKER 3018," "DOUGLAS.RTM.-COOKER 3019," "DOUGLAS.RTM.-COOKER 3040," "CLEARSOL.RTM. GUMS 7," "CLEARSOLS.RTM. GUMS 8," "CLEARSOL.RTM. GUMS 9," "CLEARSOL.RTM. GUMS 10," "DOUGLAS.RTM.-ENZYME 3622," "DOUGLAS.RTM.-ENZYME E-3610," "DOUGLAS.RTM.-ENZYME E-3615," "DOUGLAS.RTM.-ENZYME 3022," "DOUGLAS.RTM.-ENZYME 3023," "DOUGLAS.RTM.-ENZYME 3024," "DOUGLAS.RTM.-ENZYME E," "DOUGLAS.RTM.-ENZYME EC," "CROWN THIN BOILING X-10," "CROWN THIN BOILING X-18," "CROWN THIN BOILING XD," "CROWN THIN BOILING XF," "CROWN THIN BOILING XH," "CROWN THIN BOILING XJ," "CROWN THIN BOILING XL," "CROWN THIN BOILING XN," "CROWN THIN BOILING XP," "CROWN THIN BOILING XR," "DOUGLAS.RTM.-UNMODIFIED PEARL," and "DOUGLAS.RTM.-UNMODIFIED 1200." These sizing agents are all commercially available from Penford Products Co. "PENFORD.RTM.," "PENCOTE.RTM.," "PENSPRAE.RTM.," "PENGLOSS.RTM.," "APOLLO.RTM.," "ASTRO.RTM.," "ASTROCOTE.RTM.," "POLARIS.RTM.," "DOUGLAS.RTM.," and "CLEARSOL.RTM." are all registered trademarks of Penford Products Co. Other suitable starches, including "SILVER MEDAL PEARL.TM.," "PEARL B," "ENZO 32 D," "ENZO 36W," "ENZO 37D," "SUPERFILM 230D," "SUPERFILM 235D," "SUPERFILM 240DW," "SUPERFILM 245D," "SUPERFILM 270W," "SUPERFILM 280DW," "PERFORMER 1," "PERFORMER 2," "PERFORMER 3," "CALIBER 100," "CALIBER 110," "CALIBER 124," "CALIBER 130," "CALIBER 140," "CALIBER 150," "CALIBER 160," "CALIBER 170," "CHARGE +2," "CHARGE +4," "CHARGE +7," "CHARGE +9," "CHARGE +88," ""CHARGE +99," "CHARGE +110," "FILMFLEX 40," "FILMFLEX 50," "FILMFLEX 60," and "FILMFLEX 70," are all commercially available from Cargill, Inc. Cofilm compositions which are film forming starch compositions available from National Starch are also preferred in some cases.

Following sizing, one or more clay coatings are typically applied to the paperboard substrate. A preferred clay coating may include 2 clay containing layers each having a coatweight of from about 4 to about 12 lbs per 3,000 square foot ream. Particular pigmented coatings are described in U.S. Pat. No. 5,776,619 to Shanton as noted above. It will be appreciated that the coatweight of such clay coatings is predominately due to the weight of the clay.

Following the base coat or coatings, a first finish coating consisting essentially of a styrene-butadiene resin composition is applied to the coated paperboard substrate. Any suitable styrene/butadiene containing resin composition may be used. A preferred resin composition includes a carboxylated styrene-butadiene resin. A particularly preferred resin is sold by Reichold under the Trademark Tykote 96038-00.

After the first finish coating is applied a second finish coating of consisting essentially of an acrylic resin composition is applied to the first finish coating. By acrylic coating it is meant that any suitable acrylic emulsion may be used. Such emulsions are generally polymers of acrylic acid or its derivatives and salts. Such compounds may include one or more of the following: polyacrylics and polyacrylic acids such as poly(benzyl acrylate), poly(butyl acrylate)(s), poly (2-cyanobutyl acrylate), poly(2-ethoxyethyl acrylate), poly (ethyl acrylate), poly(2-ethylhexyl acrylate), poly (fluoromethyl acrylate), poly(5,5,6,6,7,7,7-heptafluoro-3-oxaheptyl acrylate), poly(heptafluoro-2-propyl acrylate), poly(heptyl acrylate), poly(hexyl acrylate), poly(isobornyl acrylate), poly(isopropyl acrylate), poly(3-methoxybutyl acrylate), poly(methyl acrylate), poly(nonyl acrylate), poly (octyl acrylate), poly(propyl acrylate), poly(p-tolyl acrylate), poly(acrylic acid) and derivatives and salts thereof; polyacrylamides such as poly(acrylamide), poly(N-butylacrylamide), poly(N,N-dibutylacrylamide), poly(N-dodecylacrylamide), and poly(morpholylacrylamide); polymethacrylic acids and poly(methacrylic acid esters) such as poly(benzyl methacrylate), poly(octyl methacrylate), poly (butyl methacrylate), poly(2-chloroethyl methacrylate), poly (2-cyanoethyl methacrylate), poly(dodecyl methacrylate), poly(2-ethylhexyl methacrylate), poly(ethyl methacrylate), poly(1,1,1-trifluoro-2-propyl methacrylate), poly(hexyl methacrylate), poly(2-hydroxyethyl methacrylate), poly(2-hydroxypropyl methacrylate), poly(isopropyl methacrylate), poly(methacrylic acid), poly(methyl methacrylate) in various forms such as, atactic, isotactic, syndiotactic, and heterotactic; and poly(propyl methacrylate); polymethacrylamides such as poly(4-carboxyphenylnethacrylamide); other alpha- and beta-substituted poly(acrylics) and poly (methacrylics) such as poly(butyl chloracrylate), poly(ethyl ethoxycarbonylmethacrylate), poly(methyl fluoroacrylate), and poly(methyl phenylacrylate). Both finish coating layers should be FDA approved material.

The first finish coating layer and second top finish coating layer are typically water borne and press-applied, suitably by way of a printing-type apparatus. Suitable coating methods include gravure techniques, flexographic techniques, hydrophilic coating techniques, coil coating, trailing blade coating methods and so forth.

Figure 1:
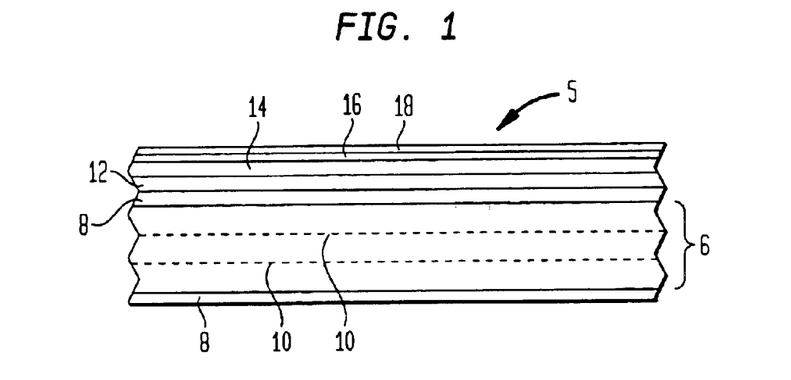
FIG. 1 is a schematic diagram illustrating a coated structure in accordance with the present invention.

A typical coated paperboard structure 5 of the present invention includes paperboard 6, provided with a starch coating 8 on its upper and lower surfaces. The starch may or may not form a continuous film on the surface of paperboard 6 as shown and largely penetrates into the paperboard as shown by dotted lines 10 in the diagram, well toward the center of the fibrous paperboard structure.

On the food service side of the paperboard, there is provided atop starch 8 a first clay coating, typically a kaolin pigment coating 12 which includes a latex binder. A second clay coating 14 is advantageously applied to coating 12. Coating 14 is likewise predominately clay and includes a latex binder. The first finish coating 16 of the present invention is applied directly to coating 14 and the second finish or top coating 18 is applied directly to the first finish coating. First finish coating 16 consists essentially of a styrene-butadiene resin composition, whereas second or top finish 18 consists essentially of an acrylic resin composition as noted above.

The product of the invention is, in general, formed with a heated matched pressware die set, from paperboard plate stock of conventional thicknesses in the range of from about 0.010 to about 0.040 inches. The springs upon which the lower die half is mounted are typically constructed such that the full stroke of the upper die results in a force applied between the dies of from about 6000 to 8000 pounds. The paperboard which is formed into the blanks is conventionally produced by a wet laid paper making process and is typically available in the form of a continuous web on a roll.

The paperboard stock is preferred to have a basis weight in the range of from about 100 pounds to about 400 pounds per 3,000 square foot ream and a thickness or caliper in the range of from about 0.010 to about 0.040 inches. Lower basis weight paperboard is preferred for ease of forming and to save on feedstock costs. Paperboard stock utilized for forming paper plates is typically formed from bleached pulp furnish, and may be double clay coated on one side. Such paperboard stock commonly has a moisture (water content) varying from about 4.0 to about 8.0 percent by weight.

The effect of the compressive forces at the rim is greatest when the proper moisture conditions are maintained within the paperboard: at least 8% and less than 12% water by weight, and preferably 9.5 to 10.5%. Paperboard having moisture in this range has sufficient moisture to deform under pressure, but not such excessive moisture that water vapor interferes with the forming operation or that the paperboard is too weak to withstand the high compressive forces applied. To achieve the desired moisture levels within the paperboard stock as it comes off the roll, the paperboard is treated by spraying or rolling on a moistening solution, primarily water, although other components such as lubricants may be added. The moisture content may be monitored with a hand held capacitive type moisture meter to verify that the desired moisture conditions are being maintained. It is preferred that the plate stock not be formed for at least six hours after moistening to allow the moisture within the paperboard to reach equilibrium.

The stock is moistened on the uncoated side after all of the printing and coating steps have been completed. In a typical forming operation, the web of paperboard stock is fed continuously from a roll through a scoring and cutting die to form the circular blanks which are scored and cut before being fed into position between the upper and lower die halves. The dies halves are heated as described above, to aid in the forming process. It has been found that best results are obtained if the upper die half and lower die half—particularly the surfaces thereof—are maintained at a temperature in the range of from about 250° F. to about 400° F., and most preferably at about 325° F.±25° F. These die temperatures have been found to facilitate the plastic deformation of paperboard in the rim areas if the paperboard has the preferred moisture levels. At these preferred die temperatures, the amount of heat applied to the blank is apparently sufficient to liberate the moisture within the blank under the rim and thereby facilitate the deformation of the fibers without overheating the blank and causing blisters from liberation of steam or scorching the blank material. It is apparent that the amount of heat applied to the paperboard will vary with the amount of time that the dies dwell in a position pressing the paperboard together. The preferred die temperatures are based on the usual dwell times encountered for normal production speeds of 30 to 60 pressings a minute, and commensurately higher or lower temperatures in the dies would generally be required for higher or lower production speeds, respectively.

Figure 2:
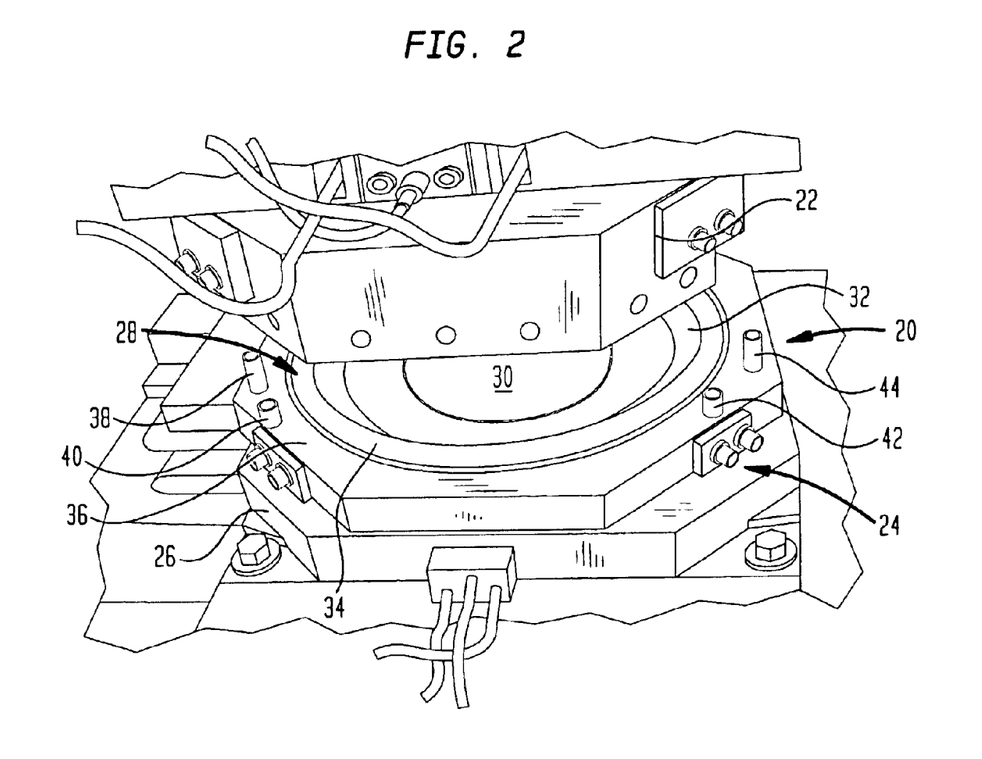
FIG. 2 is a schematic diagram of a matched die set forming press.
Figure 3:
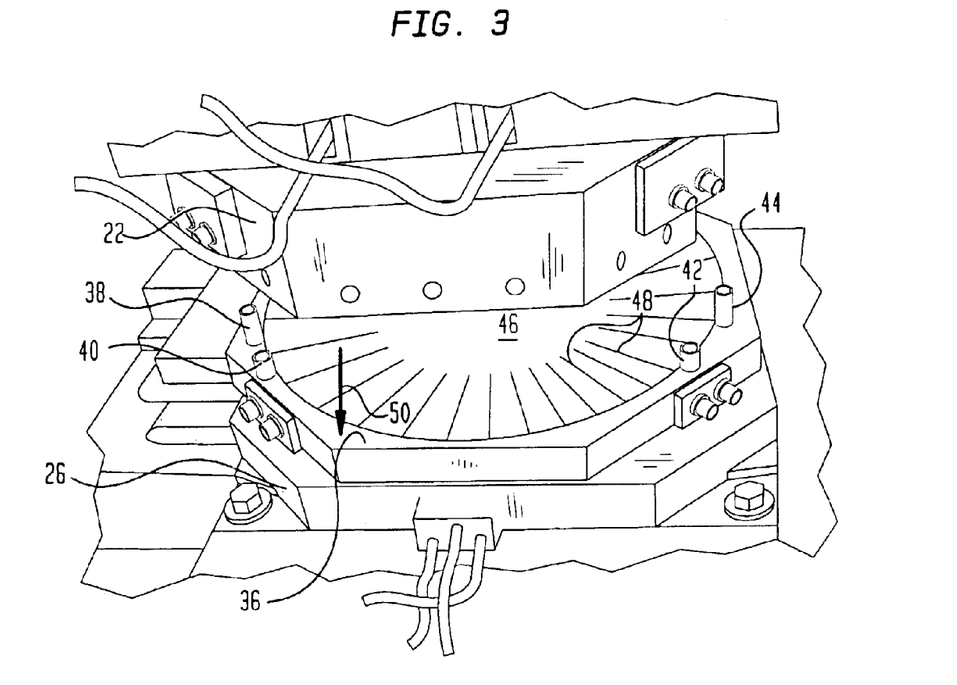
FIG. 3 is a schematic illustration of the apparatus of FIG. 2 showing a scored paperboard blank positioned for forming.

As will be appreciated by one of skill in the art, the knock-outs are important for holding the container blank on center during formation and for separating the finished product from the die halves, particularly during high speed operation. There is shown in FIGS. 1 through 4 a metal die press 20 including an upper die press assembly 22, commonly referred to as a punch die assembly and a lower die assembly 24. That is, assembly 24 includes a mounting plate 26, a segmented die 28 with a knock-out 30, a sidewall forming section 32, a rim forming portion 34 and a draw ring 36. It will be appreciated that metal die press 20 is ordinarily operated in an inclined state in accordance with the following United States Patents, the disclosures of which have been incorporated by reference into this application:

U.S. Pat. No. 5,326,020;
U.S. Pat. No. 5,249,946;
U.S. Pat. No. 4,832,676;
U.S. Pat. No. 4,721,500;
U.S. Pat. No. 4,721,499;
U.S. Pat. No. 4,609,140;
U.S. Pat. No. 4,606,496 The die set includes a plurality of freely rotating stop pins 38, 40, 42 and 44. Each pin 38–44 is constructed of steel or other suitable material and includes an elongated shaft as well as a central bore. Bolts, preferably socket head shoulder bolts, are used to secure pins 38–44 to draw ring 36 of segmented die 28 as shown in FIG. 2. Referring to FIG. 3 there is shown a blank 46 provided with a plurality of scores 48 which are subsequently formed into pleats in the final product. That is to say, paperboard is gathered and pressed into a pleat about scores 48. The pleats preferably are of the same thickness as adjacent regions of the plate and are substantially radially coextensive with the scores from which they are formed. Products in accordance with the present invention thus preferably include a plurality of circumferentially spaced densified regions of integrated fibrous structures extending radially over the sidewall and rim; most preferably including at least about three layers of paperboard reformed into substantially integrated fibrous structures generally inseparable into their constituent layers and having a thickness generally equal to circumferentially adjacent areas of the rim.

Figure 4:
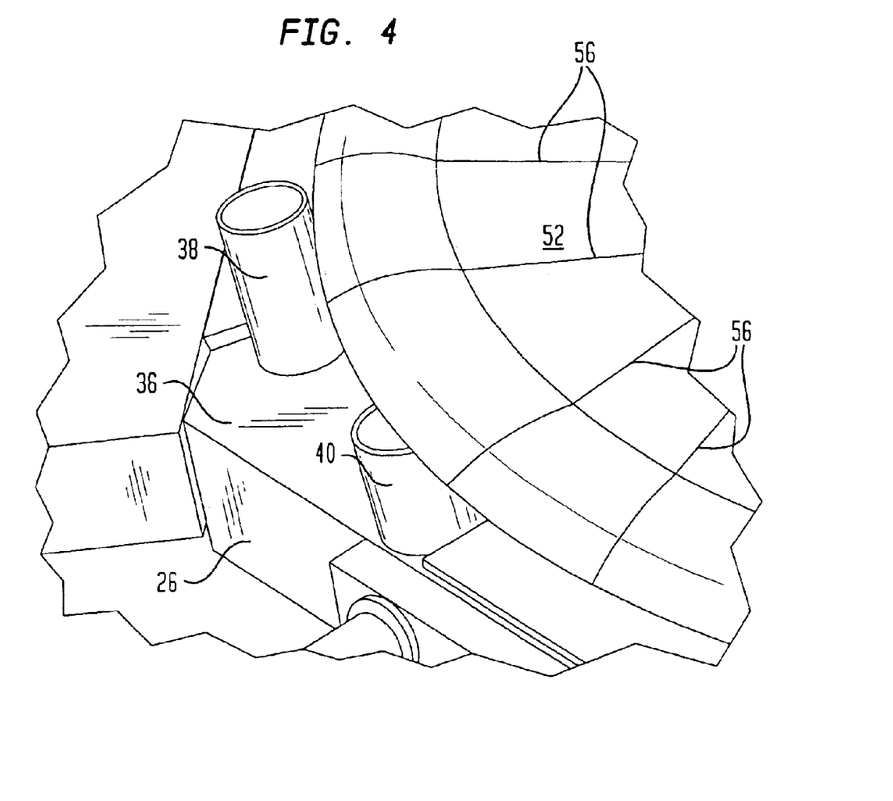
FIG. 4 is a schematic detail of the apparatus of FIG. 2 showing a finished product after forming.

As shown in FIG. 3 it would be appreciated that the rotating pin blank stops 38–44 are located on the forward portion of the lower die assembly 24, that is, the downstream production portion of the die, such that a gravity fed blank, such as blank 46, will contact the blank stops as shown. It could be seen that pins 38–44 are in opposing relationship at the periphery at the lower die at a distance which is less than the maximum transverse dimension of the blank, in this case the diameter of blank 46 since it is a circular blank and that pins 40 and 42 are also located at a distance which is also less than the diameter of the blank inasmuch as the plate will move in the direction indicated by arrow 50 in the production process, it is important that the rotating pin blank stops do not interfere with the motion of the finished product. After the blank is positioned as shown in FIG. 3, the top assembly 22 is lowered and the forming process is carried out in a conventional manner and the product 52 is formed as shown in FIG. 4. In FIG. 4 there is shown schematically a plurality of pleats 56 which correspond to scores 48. That is to say, the excess circumferential material from the planar paperboard blank gathers about scores 48 when a three-dimensional geometry is imparted to the product to form pleats 56 which thus have an amount of material therein corresponding to a plurality of paperboard layers. Preferably, this excess material is pressed into substantially integrated fibrous structures, that is, where pressed layers exhibit reduced void fractions as compared to the uncompressed board and are not readily separated into their constituent layers in normal use under the loads normally encountered in such use. Without wishing to be bound by any theory, it is believed the finish coatings of the present invention enhances the formation of strong pleats as reflected particularly by the enhanced rigidity of the inventive articles seen below.

Most preferably, the integrated fibrous structures of the pleats contain material corresponding to about 3 thicknesses of paperboard, yet have a thickness substantially similar to adjacent circumferential areas of the sheet.

Materials and Test Methods

In the examples below, the following water-borne coating materials were used:

TABLE 1

Materials

| Designation | Class | Source |
|---|---|---|
| Tykote Base 96038-00 ("Tykote") | Aqueous Carboxylated Styrene-Butadiene Emulsion | Reichold Inc. (North Carolina) |
| Existing Acrylic | Aqueous Acrylic Emulsion | *** |
| Cork 6979a | Aqueous Acrylic Emulsion | Cork Industries (Pennsylvania) |
| Michelman 706 | Aqueous Acrylic Emulsion | Michelman, Inc. (Ohio) |

In the following Examples, gloss was measured using test method ASTM D523-89, entitled 60° Gloss. Plate moisture pickup was determined by weighing the test specimens, filling the plates approximately ½ fall with dionized water, the initial temperature of the water in the plates being 71° C. (160° F.), leaving the water in the plates for 30 minutes and measuring weight increase. Wet and Dry Rigidity were measured on a Single-Service Institute (SSI) Plate Rigidity Tester, Model ML4431-2, motorized. Each of these tests uses the SSI Rigidity Tester to measure the force required to deflect the rim 0.5 inches while supporting the plates at their geometric center. For the Wet Rigidity test, the plates are wet with hot sauce at 150° F.

EXAMPLES 1–3

A series of paperboard pressware containers were prepared as generally above utilizing a starch-sized and clay-coated paperboard substrate provided with the 2 finish coats (the base finish coat being the first applied finish coat) using the materials indicated above in the amounts set forth in Table 2. A hydrophilic coating technique was employed and the containers were pressed utilizing a die temperature of from about 300 to about 350° F. Gloss was measured in accordance with ASTM D523-89. Gloss units (60 degrees) are reported. The SBR/Acrylic finish coating exhibited high gloss especially when at least about 0.5 lbs/ream SBR resin composition is used.

EXAMPLES 4–7

Following the procedure of Examples 1–3, another series of containers were prepared using more finish coating resin as is reported in Table 3. The gloss of the SBR/Acrylic system is even further improved in this series.

EXAMPLES 8–10

The coated paperboard containers of the invention were compared with acrylic/acrylic finish coated products for performance in Table 4.

TABLE 2

Comparison of Gloss SBR/Acrylic vs. Acrylic/Acrylic

| Example | Base Coat Type | Base Finish Coat Amount #/rm | Top Finish Coat Type | Top Coat Amount #/rm | Gloss 60 Degree, units Die positions 1–5 Average (Std. Dev) |
|---|---|---|---|---|---|
| 1 | Existing Acrylic | 0.55 | Existing Acrylic (Control) | 0.50 | 25 (1.5) |
| 2 | Tykote | 0.55 | Michelman 706 | 0.60 | 50 (1.3) |
| 3 | Tykote | 0.35 | Cork 6979a | 0.61 | 31 (2.7) |

TABLE 3

Comparison of Gloss SBR/Acrylic vs. Acrylic/Acrylic

| Example | Base Finish Coat Type | Base Finish Coat Amount #/rm | Top Finish Coat Type | Top Coat Amount #/rm | Gloss 60 Degree, units Average |
|---|---|---|---|---|---|
| 4 | Existing Acrylic | 0.61 | Existing Acrylic (Control) | 0.57 | 31 |
| 5 | Tykote | 0.73 | Cork 6979a | 0.56 | 55 |
| 6 | Existing Acrylic | 0.61 | Existing Acrylic (Control) | 0.61 | 29 |
| 7 | Tykote | 0.81 | Michelman 706 | 0.60 | 57 |

TABLE 4

Physical Properties SBR/Acrylic vs. Acrylic/Acrylic

| Physical Property ↓ | Example 8 (Control) | Example 9 | Example 10 |
|---|---|---|---|
| Base Finish Coating | Existing Acrylic | Tykote | Tykote |
| Top Finish Coating | Existing Acrylic | Michelman 706 | Cork 6979a |
| Dry Rigidity, grams | 294 | 405 | 383 |

TABLE 4-continued

Physical Properties SBR/Acrylic vs. Acrylic/Acrylic

| Physical Property ↓ | Example 8 (Control) | Example 9 | Example 10 |
|---|---|---|---|
| Wet Rigidity, grams | 214 | 325 | 346 |
| Plate Moisture Pickup, % | 11 | 3 | 6 |

The containers of Table 4 are of like construction, that is the plates of Examples 8 through 10 have the same geometry and coatings except that control Example 8 has 2 finish coatings of the same thickness but different composition than Examples 9 and 10 of the invention. The plates of the invention have reduced moisture pickup of roughly 73% and 45% over Control Example 8; increased dry rigidity of roughly 38% and 30% as well as increased wet rigidity of about 52% and 62%. The finish coating system of the invention thus supplies, in addition to high gloss, unexpected enhancements of highly desirable product attributes.

While the invention has been described in detail in connection with various embodiments, modification of such embodiments within the spirit and scope of the present invention, set forth in the appended claims, will be readily apparent to one of skill in the art.

What is claimed is:

1. A disposable shaped paperboard food container with a bilayer finish press-formed in a heated die set from a paperboard blank,
    said paperboard blank being prepared from a paperboard substrate provided with a first finish coating layer consisting essentially of a styrene-butadiene resin composition and a second, top coating finish layer consisting essentially of an acrylic resin composition applied to said first finish coating layer wherein said first and second coatings contain up to about 2 lbs of mineral filler per 3,000 square foot ream and, wherein said food container exhibits a surface gloss of at least about 40 gloss units as measured by test method ASTM D523-89, 60 degree method.

2. The paperboard food container according to claim 1, wherein said food container exhibits a surface gloss of at least about 50 gloss units as measured by test method ASTM D523-89, 60 degree method.

3. The paperboard food container according to claim 1, wherein said food container exhibits a surface gloss of between about 45 gloss units and about 65 gloss units as measured by test method ASTM D523-89, 60 degree method.

4. The paperboard food container according to claim 1, wherein said styrene-butadiene resin composition and said acrylic resin composition are aqueous emulsions.

5. The paperboard food container according to claim 1, wherein said first finish coating layer is applied to said paperboard substrate in an amount of from about 0.25 pounds to about 1.5 pounds per 3,000 square foot ream.

6. The paperboard food container according to claim 5, wherein said first finish coating layer is applied to said paperboard substrate in an amount of at least about 0.5 pounds per 3,000 square foot ream.

7. The paperboard food container according to claim 6, wherein said first finish coating layer is applied to said paperboard substrate in an amount of from about 0.6 pounds to about 1 pound per 3,000 square foot ream.

8. The paperboard food container according to claim 1, wherein said second top finish coating layer is applied to said paperboard substrate in an amount of at least about 0.5 pounds per 3,000 square foot ream.

9. The paperboard food container according to claim 1, wherein said second top finish coating layer is applied to said paperboard substrate in an amount of from about 0.25 pounds to about 1 pound per 3,000 square foot ream.

10. The paperboard food container according to claim 1, wherein said styrene-butadiene resin composition comprises a carboxylated styrene-butadiene resin.

11. The paperboard food container according to claim 1, wherein said paperboard substrate has a basis weight of from about 100 to about 300 pounds per 3,000 square foot ream.

12. The paperboard food container according to claim 11, wherein said paperboard substrate has a basis weight of from about 125 pounds to about 150 pounds per 3,000 square foot ream.

13. The paperboard food container according to claim 11, wherein said paperboard substrate has a basis weight of from about 150 to about 200 pounds per square foot ream.

14. The paperboard food container according to claim 1, wherein said paperboard substrate is sized with a starch composition in an amount of from about 4 to about 15 pounds per 3,000 square foot ream and provided with a clay coating prior to being coated with said first finish coating layer.

15. The paperboard food container according to claim 14, wherein said paperboard substrate is coated with one or more clay coatings in a coatweight amount of from about 8 lbs of clay coating per 3,000 square foot ream to about 24 lbs of clay coating per 3,000 square foot ream underneath with said first and second finish coating layers.

16. The paperboard food container according to claim 1, wherein the forming surfaces of said heated die set are maintained at a temperature of from about 250° F. to about 400° F. during pressing of said container.

17. A coated paperboard for making a paperboard food container with a bilayer finish wherein said container exhibits a surface gloss of at least about 40 gloss units as measured by test method ASTM D523-89, 60 degree method, said coated paperhoard comprising:
    a) a paperboard substrate sized with from about 4 pounds of starch per 3,000 square foot ream to about 15 pounds of starch per 3,000 square foot ream and provided with a clay coating;
    b) a first finish coating layer consisting essentially of a styrene-butadiene resin composition applied to said clay coating; and
    c) a second finish top coat layer consisting essentially of an acrylic resin composition applied to said first layer wherein said first and second finish coatings contain up to about 2 lbs of mineral filler per 3,000 square foot ream.

18. The coated paperboard according to claim 17, wherein said paperboard substrate is coated with one or more clay coatings in a coatweight amount of from 8 lbs of clay coating to about 24 lbs of clay coating per 3,000 square foot ream underneath said first finish coating layer and said second finish top coat layer.

19. The coated paperboard food container according to claim 17, wherein said styrene-butadiene resin composition acid said acrylic resin composition are aqueous emulsions.

20. The coated paperboard according to claim 17, wherein said first finish coating layer is applied to said paperboard substrate in an amount of from about 0.25 pounds to about 1.5 pounds per 3,000 square foot ream.

21. The coated paperboard according to claim 20, wherein said first finish coating layer is applied to said paperboard substrate in an amount of at least about 0.5 pounds per 3,000 square foot ream.

22. The coated paperboard according to claim 21, wherein said first finish coating layer is applied to said paperboard substrate in an amount of from about 0.6 pounds to about 1 pound per 3,000 square foot ream.

23. The coated paperboard according to claim 17, wherein said second top finish coating layer is applied to said paperboard substrate in an amount of at least about 0.5 pounds per 3,000 square foot ream.

24. The coated paperboard according to claim 23, wherein said second top finish coating layer is applied to said paperboard substrate in an amount of from about 0.25 pounds to about 1 pound per 3,000 square foot ream.

25. The coated paperboard according to claim 17, wherein said styrene-butadiene resin composition comprises a carboxylated styrene-butadiene resin.

26. The paperboard food container according to claim 1, wherein said food container exhibits a surface gloss of 45 or more gloss units as measured by test method ASTM D523-89, 60 degree method.

27. The coated paperboard according to claim 17, formed into a container exhibiting a surface gloss of 45 or more gloss units as measured by test method ASTM D523-89, 60 degree method.

* * * * *

UNITED STATES PATENT AND TRADEMARK OFFICE
CERTIFICATE OF CORRECTION

PATENT NO.  : 6,893,693 B2
DATED       : May 17, 2005
INVENTOR(S) : Dean P. Swoboda et al.

It is certified that error appears in the above-identified patent and that said Letters Patent is hereby corrected as shown below:

Column 5,
Line 9, change "CLEARSOLS.RTM." to -- CLEARSOL.RTM. --;
Line 59, change "styrene/butadiene" to -- styrene-butadiene --;
Line 64, delete the first instance of "of";

Column 6,
Line 27, change "poly(4-carboxyphenylnethacrylamide)" to -- poly(4-carboxyphenylmethacrylamide) --; and Column 7,
Line 35, change "dies" to -- die --.

Signed and Sealed this

Eighth Day of November, 2005

JON W. DUDAS
*Director of the United States Patent and Trademark Office*